United States Patent Office 3,005,845
Patented Oct. 24, 1961

3,005,845
PROCESS INVOLVING THE ADDITION OF HYDROGEN BROMIDE TO 2,6-DIMETHYL-2,7-OCTADIENE, PRODUCTS THEREFROM AND PROCESS OF PRODUCING ESTERS
Joseph P. Bain, Jacksonville, Fla., assignor to The Glidden Company, Cleveland, Ohio, a corporation of Ohio
No Drawing. Filed Apr. 10, 1959, Ser. No. 805,363
21 Claims. (Cl. 260—489)

This invention is generally concerned with the conversion of 2,6-dimethyl-2,7-octadiene to compounds valuable for perfumery. More particularly, it is concerned with a process for the conversion of 2,6-dimethyl-2,7-octadiene to novel intermediate compositions which are useful in the preparation of acylic terpenic alcohols and esters oxygenated at the number eight carbon atom. These include citronellol and its esters and hydroxydihydrocitronellol and its esters.

Citronellol is a valuable and popular constituent of odorants for soap and the like. It is further valuable as a source of citronellal, which compound is readily cyclized and converted to methanol. Hydroxydihydrocitronellol is readily dehydrogenated to hydroxydihydrocitronellal, known commercially as "hydroxycitronellal," a valuable synthetic odorant. In the past, these compounds have been derived largely from oil of citronella, an imported essential oil whose availability and price have been subject to wide fluctuations. In contrast, 2,6-dimethyl-2,7-octadiene is readily available by pyrolysis of pipane which in turn is produced by hydrogenation of alpha or beta-pinene. The pinenes are abundantly available from domestic turpentines and at low cost.

The solution to the problem of converting 2,6-dimethyl-2,7-octadiene to citronellol, for example, in good economical yields is not readily apparent by reference to the prior art or to the known reactions of the compound. In copending application, Serial No. 576,795, filed April 9, 1956, now U.S. Patent 2,902,510, for example, it is shown that 2,6-dimethyl-2,7-octadiene readily adds one mole of hydrogen chloride or hydrogen bromide to produce 2-chloro (or 2-bromo)-2,6-dimethyl-7-octene. The remaining double bond does not hydrohalogenate to any appreciable extent under the hydrohalogenation conditions there described even though hydrogen chloride addition is continued above the one mole level. Thus, where 95 to 98% of 2,6-dimethyl-2,7-octadiene is contacted with anhydrous hydrogen chloride gas at 20 to 30° C. on about a mole level, there is obtained about 93 to 94% of 2-chloro-2,6-dimethyl-7-octene. Comparable yields are obtained with hydrogen bromide instead of hydrogen chloride, but in either case little or no hydrogen halide adds to the 7 and 8 double bond. In addition to the problem herein existing, for the purposes of the object(s) of this invention, it is necessary that a halogen acid add to the 7 and 8 double bond in such a fashion that the halogen attaches itself to the number 8 carbon atom, since otherwise (in a normal or Markownikow addition) the halogen, if present at the number 7 carbon atom, would not result in the compounds to which this invention is directed. By the process of this invention, I have succeeded in solving these and the like problems, as is described hereinbelow.

It is therefore an object of this invention to provide a process for conversion of a low cost domestic raw material to valuable perfumery components and intermediates.

Another object is to convert 2,6-dimethyl-2,7-octadiene to citronellol.

Another object is to convert 2,6-dimethyl-2,7-octadiene to hydroxydihydrocitronellol.

Another object is to provide a process for producing citronellyl bromide.

Another object is to provide a process for producing 2-halo-dihydrocitronellyl bromide, a new composition of matter.

A still further and important object of this invention is to produce citronellyl products rich in the "alpha form" as distinguished from the "beta form" normally present to a greater amount in products such as citronellol as will be discussed more fully below.

The objects of this invention are accomplished by my finding that peroxides or free radicals activate or catalyze the double bond connecting the 7 and 8 carbon atoms of the 2,6-dimethyl-2,7-octadiene molecule, thereby facilitating reaction of this portion of the molecule with hydrogen bromide and permitting a series of reactions resulting ultimately in the products of this invention. Moreover, by these findings and reactions I beneficially take advantage of the known and important anti-Markownikow addition of hydrogen bromide (in the treatment of olefins with hydrogen bromide in the presence of peroxides) to the 7 and 8 carbon atoms whereby, by this treatment, I can directly place the bromide radical on the number 8 carbon and by subsequent treatment replace it with a hydroxyl or ester group. In essence, then, I treat compounds represented by the following structural formula:

(1) 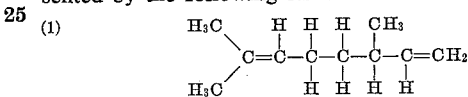

or (2) 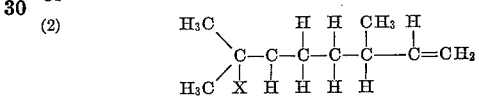

where X is bromine or chlorine, with hydrogen bromide to obtain a compound represented by the following structural formula:

(3) 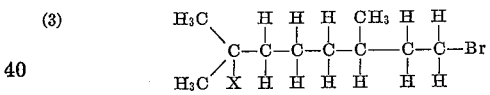

Stated in another manner, I have found that I can convert a compound represented by the formula

wherein R is selected from the group of radicals consisting of

or

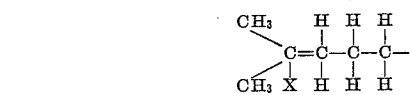

and where X is chlorine or bromine, to the compound of Formula 3 above by the addition of hydrogen bromide to said compound(s) in the presence of a catalytic amount of a peroxide.

Thus, starting with either 2,6-dimethyl-2,7-octadiene in Formula 1, or 2-chloro-(or 2-bromo)-2,6-dimethyl-7-octene (where X is chlorine or bromine in Formula 2), I obtain the 2-halo-8-bromo-2,6-dimethyl octane exemplified by structural Formula 3, which can thereafter be converted to an alcohol ester or ether.

It is to be noted that throughout this specification, compounds are named as derivatives of 2,6-dimethyl octane for the sake of consistency and thus beta-citronellol (the ordinary commercial form) is 2,6-dimethyl-2-octene-8-ol. Also, the compound I refer to as 2,6-dimethyl-2,7-octadiene may be called 3,7-dimethyl-1,6-octadiene, but I have chosen to number the chain as indicated by the first of these alternative names.

It will be appreciated that according to the Markownikow rule, it would be expected that 2-halo-7-bromo-2,6-dimethyl octane would be the "normal" product of the addition. It is evident, however, that I am not interested in the "normal" product but in the "abnormal" or "anti-Markownikow" addition of hydrogen bromide to the double bond involving the number 7 and 8 carbon atoms. Conditions suitable for conducting "normal" and "abnormal" additions of hydrogen bromide to double bonds are discussed by Kharasch and associates in a large number of papers appearing in Journal of the American Chemical Society and Journal of Organic Chemistry, and there exist many papers by others throughout the chemical literature. (See Hey and Waters, Chemical Reviews, 21; 202 (1937); Waters, The Chemistry of Free Radicals, Oxford University Press, 1946; Tobolsky and Mesrobian, Organic Peroxides, Interscience Publishers, 1954; Kharasch et al., Journal of Organic Chemistry, 1; 393 (1936), etc.) In general, it is taught that in the presence of free radicals, hydrogen bromide adds to olefins in anti-Markownikow fashion. Means for assuring the presence of the necessary free radicals are taught by the quoted references. The use of air or oxygen or peroxides is taught as a satisfactory means for generating free radicals though many other ways are also taught.

Although the prior art teaches in general that the presence of peroxides influences the addition of hydrogen bromide to olefins in anti-Markownikow fashion, I have found that the presence of free radicals and peroxides in 2,6-dimethyl-2,7-octadiene have a peculiar and most beneficial effect on this molecule. Thus, in the hydrobromination of the diene in the presence of peroxides, the double bond between the two and three carbon atoms adds the hydrogen bromide in normal fashion, that is, in Markownikow fashion, despite the presence of the peroxides which, according to the prior art, would be expected to add abnormally. In addition to this, the double bond between the 7 and 8 carbon atoms, which normally does not add hydrogen bromide (or hydrogen chloride) to any significant extent in the absence of free radicals, becomes activated by their presence, that is, it is catalyzed by the peroxides, and adds the hydrogen bromide readily and, beneficially, in abnormal fashion. By virtue of these observations and others to be shown hereinafter, I have provided an efficient process for the conversion of a low-cost domestic raw material into valuable products more fully explained below.

My invention relates broadly to a process for converting a di-halogenated 2,6-dimethyl octane to esters, glycols, alcohols and ethers by a process which comprises: (a) treating 2,6-dimethyl-2,7-octadiene or 2-chloro (or 2-bromo)-2,6-dimethyl-7-octene with hydrogen bromide in the presence of a peroxide catalyst and (b) removing the elements of HCl (or HBr) from the number 2 carbon atom and a carbon atom adjacent thereto to obtain alpha and beta citronellyl bromide and (c) replacing the bromide group from the number 8 carbon atom with a hydroxyl, ether or ester group, or (d) in step (b) above, replacing the halogen group with a hydroxyl group to obtain an 8-bromo-2-hydroxy-2,6-dimethyl octane (a new intermediate) and by subsequent treatment a glycol product.

It is a special feature of the present invention that mixtures of the alpha and beta forms of citronellol, and of either optical sign, are readily produced. There is considerable confusion in the terpene literature as to the identity of citronellol and rhodinol, some authors regarding citronellol as the alpha form, rhodinol as the beta form and other authors take the opposite view. Rhodinol commands a much higher price than citronellol because of its unique odor value and much effort has been expended in attempting economic synthesis of "rhodinol" from "citronellol." (See "U.V. Route to Rhodinol," Chemical Week, July 10, 1954, page 80.) Joffre (U. S. 2,679,476, issued May 25, 1954) discusses the isomerization of citronellol to rhodinol and states:

"Citronellol is thought to contain more of a substance in its alpha or limonene form, identified by the Geneva system of chemical nomenclature as 2,6-dimethyl-1-octen-8-ol; whereas rhodinol is supposed to possibly be equal parts of limonene and terpinolene identified as 2,6-dimethyl-2-octen-8-ol, the beta form of this substance. While the Geneva nomenclature used is based on the best scientific evidence available at present, it still may not correctly describe these substances. In any case, citronellol and rhodinol are actually mixtures of these substances."

Thus while it cannot be stated that the subject is completely elucidated, the conclusion may be reached from the best available sources that rhodinol is a mixture of the alpha and beta forms described herein as alpha- and beta-citronellol. Since I have provided a process for producing mixtures very rich in the alpha form and show how readily this is converted to the commercially available beta form identical to that isolated from citronella oil, etc., then it is evident that the herein described alpha form of citronellol is particularly valuable as a source of the mixed forms which constitute the highly prized "rhodinol." Further, I may isomerize the alpha-rich citronellol to produce any desired ratio of alpha/beta forms.

In one specific embodiment of this invention, I treat 2,6-dimethyl-2,7-octadiene with hydrogen bromide in the presence of free radicals to obtain 2,8-dibromo-2,6-dimethyl octane (a new compound), and I thereafter convert the dibromo compound to citronellyl bromide by removing the elements of HX (where X is bromine) from the number 2 carbon atom and a carbon atom adjacent thereto, by the application of heat under pyrolytic conditions, thereby resulting in regeneration of the double bond involving the number 2 carbon atom, but not affecting the elements of HX in the 7 and 8 carbon atoms. The bromine group on the number 8 carbon can thereafter be replaced with a hydroxyl group by hydrolyzing it with an aqueous alkali or alkaline material to produce alpha and beta citronellol, or can be replaced with a lower molecular weight fatty acid radical to produce an ester by treating citronellyl bromide with an alkali metal salt of a fatty acid. It is also within the scope of this process to treat the citronellyl bromide with an alcoholic caustic solution to obtain the ether by the replacement of the bromine group with the ether group.

In an alternate treatment, under this specific embodiment, I can convert the dibromo compound to a glycol by hydrolyzing the dibromo compound with an aqueous base to produce hydroxy dihydro citronellol. The glycol can thereafter be dehydrogenated to hydroxy citronellal or dehydrated to citronellol as will be described hereafter.

In another specific embodiment of this invention, I hydrochlorinate 2,6-dimethyl-2,7-octadiene either in the presence or absence of free radicals, but preferably in the absence, (since no useful purpose is served by the free radicals in this step) to obtain 2-chloro-2,6-dimethyl-7-octene, and subsequently treat this chloro compound with hydrogen bromide in the presence of free radicals to obtan 2-chloro-8-bromo-2,6-dimethyl octane (a new compound). The 2-chloro-8-bromo compound can thereafter be converted to alpha and beta citronellyl bromide by the treatment described above for the dibromo compound. The citronellyl bromide can thereafter be converted to esters, ethers, or the 2-chloro-8-bromo compound can be converted to the glycol, substantially as described above for the dibromo compound.

In conducting the hydrobromination, I assure the presence of the necessary free radicals by irradiating the intimate mixture of gas and olefin or by adding peroxides to the mixture or by conducting the reaction in presence of oxygen or by any other convenient method. If desired, the olefin may be blown with air or oxygen to produce hydroperoxides in situ and prior to admission of the hydrogen bromide gas.

The process may be conducted batchwise or continuously, but I prefer the latter mode of operation, and I have obtained good and economical results by bringing together hydrogen bromide gas, olefinic material and catalyst as continuous streams.

Temperature is not critical; the reaction takes place at 0° C. or somewhat below or up to 70 to 90° C. or higher. It is convenient and satisfactory to operate at 35 to 65° C., however, in standard types of equipment, and I ordinarily use temperatures of this general magnitude.

In using peroxides as sources of free radicals, it is convenient to dissolve or suspend about ½ to 2% of the peroxide in the olefin and then contact this mixture with excess hydrogen bromide. Of course, if the diene hydrocarbon is being treated twice as much hydrogen bromide is required per mole as if the 2-chloro- or 2-bromo-2,6-dimethyl-7-octene is being treated. The quantity of peroxide is usually not critical but with quantities below ½% less complete reaction may take place, and in general, quantities in excess of 2% are not required. If incomplete reaction takes place, the product may be recontacted with more hydrogen bromide but usually in such recycling it is necessary to add more peroxide as a source of new free radicals.

In conducting the process in a continuous manner, the gas and peroxide treated olefin are brought together continuously, suitably, for example, in a vertical glass column where hydrogen bromide gas enters at the base and peroxide treated olefin at the top. Suitable provision is made at the bottom of the columns for draining out the hydrobrominated product and at the top for venting the excess hydrogen bromide gas and any inert gasses. The excess hydrogen bromide may be recycled to the bottom of the reactor again so that the actual consumption of hydrogen bromide does not exceed appreciably the amount required for saturation of the olefinic linkages.

Peroxides need not be added to the olefin, however. If air or oxygen is admitted to the reaction, suitable by mixing it with the entering hydrogen bromide, good yields of 8-bromo compounds are obtained. The ratio of air or oxygen to hydrogen bromide by volume may vary over a wide range, but good results have been obtained at ratios of 0.03 to 0.3 volume/volume.

The reaction system may be at atmospheric or lower pressure but I find it convenient to use atmospheric or preferably somewhat higher pressures, say 5 to 15 pounds p.s.i.g. in order to achieve faster reaction rates.

When peroxide catalysts are used, they may be peracids, aroyl peroxides, acyl peroxides, alkyl peroxides, hydroperoxides, ketone peroxides and hydrogen peroxide. Among those which I have employed successfully as catalysts are benzoyl peroxide, lauroyl peroxide, t-butyl hydroperoxide, peracetic acid, di-t-butyl peroxide, t-butyl perbenzoate, methyl-ethyl-ketone peroxide and the like. Since air or oxygen is the cheapest of catalysts and is satisfactory, I prefer to use one of these.

Inert solvents such as hexane, acetic acid, etc., may be employed but are not necessary. The reaction is conducted with commercially dry materials, but traces of moisture are not objectionable.

In producing 2,8-dibromo-2,6-dimethyl octane the di-olefin can be dihydrobrominated at a single step. One mole of hydrogen bromide adds to the double bond involving the number 2 carbon atom to produce the tertiary bromide which forms whether catalysts are present or not. However, a little 3-bromo compound may be produced in the presence of anti-Markownikow catalyst. The second mole adds to the double bond involving the 7 and 8 carbon atoms so that the bromine attaches to the number 8 or primary carbon. In the absence of catalyst no, or very little hydrogen bromide reacts with this terminal olefin position so that little or no secondary bromides are produced under any circumstances. The catalyst therefore not only directs the addition to the desired position but also acts as a catalyst for addition.

If desired, the monohydrobromide may be first isolated from a non-catalytic reaction and then subjected to catalytic addition of the second mole of hydrogen bromide. This is not necessary, however, as indicated above. If the chlorobromide is to be produced, the di-olefin is first monohydrochlorinated. No catalyst is necessary. The monohydrochloride is then hydrobrominated in the presence of oxygen, peroxide catalysts or other catalysts known to generate free radicals under conditions of the treatment.

A suitable arrangement of equipment for producing the di-bromide or the chlorobromide consists of two water-cooled glass reaction tubes. In the first, hydrogen halide and diolefin are brought together, say in countercurrent fashion by flowing diolefin in the top and removing the monohydrohalide at the bottom. The hydrogen halide can be admitted at the bottom of the tube and excess gaseous halide and impurities can be vented at the top. Atmospheric to 20 p.s.i.g. pressures can be used. From the bottom of the first reactor, the monohydrohalide flows or is pumped to the top of the second reactor tube and flows down the inside of this as hydrogen bromide mixed with oxygen or air is passed countercurrent up the tube. About 15 to 25% excess hydrogen bromide over that required by theory is sufficient to assure substantially complete conversion of the monohydrohalide to the dihydrohalide. The excess hydrogen bromide is recycled or is recovered as monohydrobromide by scrubbing the gas with diolefin. The quality of the fully hydrobrominated product withdrawn continuously from the second reactor can be determined readily by its specific gravity, or, more accurately, by its infrared spectrum. Refractive index and other physical properties also serve as guides to the quality of the mono- and dihalides.

Since hydrogen chloride is cheaper than hydrogen bromide, I will ordinarily prefer to produce the tertiary chloride and then hydrobrominate this to produce the primary bromide.

Having produced the 2-chloro-8-bromo-, or the 2,8-dibromo-2,6-dimethyl octane, I can choose to treat it by any of several different ways to obtain desired alcohols and their derivatives as described generally heretofore.

To produce hydroxycitronellol, I hydrolyze the dihalide with an excess of an aqueous base, suitably with say one to three normal aqueous sodium hydroxide or sodium carbonate or preferably, with a suspension of lime or calcium carbonate in water. The identity of the base is not critical, its function is to neutralize the hydrogen halide removed by hydrolysis. The temperature of hydrolysis is not critical, the tertiary halide is first hydrolyzed then the primary halide. Suitable hydrolysis conditions are 80 to 100° C. for ten to thirty hours though the time may be shortened somewhat by use of temperatures above 100° C. if an autoclave is used. Even aqueous bases such as aqueous solutions of alkali metal salts of carboxylic acids can be used in the hydrolysis if desired though in this case, a little ester is usually formed and must be saponified if the glycol is to be recovered as such.

When the dihalide has been hydrolyzed, the glycol is separated from the hydrolysis mixture by decantation and/or extraction and is purified by fractional distillation. Any recovered halides are in the lower boiling fractions and are recycled to hydrolysis. The glycol can be dehydrogenated to hydroxydihydrocitronellal (hydroxycitronellal of commerce) by treating it with copper chromite and heating the mixture in the stillpot of an efficient fractionating column, more fully as described in co-pending application Serial No. 658,515 filed May 13, 1957.

I can, of course, also dehydrate the glycol to citronellol by cohobating it with 25% phosphoric acid, though ordinarily I will not use the glycol for the preparation of citronellol in this manner.

Conversion of the dihalide to citronellol involves removal of halide from the number 2 carbon atom of the chain along with a hydrogen atom from carbon number one to produce a double bond involving the number 1 and 2 carbon atoms, a so-called "α" double bond or isopropenyl form. Some of the "β" or isopropylidene form is also produced, however, by abstraction of hydrogen from the number 3 carbon atom so that a double bond is formed involving the number 2 and 3 carbon atoms. In basic media, the "α" form is stable but hot dilute acids, such as 10% sulfuric acid, convert the "α" to the "β" form. The proportion of the two forms obtained then depends upon the conditions of removal of the tertiary halide group. This feature of the process of this invention is important in view of the value of products such as rhodinol.

As shown in the examples, I can also pyrolyze the dihalide to the monohalide, citronellyl bromide, the latter then being rich in the "α" or isopropenyl form. The gas evolved, the hydrogen halide can be recovered. When such citronellyl bromide, rich in the alpha form is boiled with dilute mineral acids, such as 5 to 20% aqueous hydrobromic acid, it is converted almost completely to the β or isopropylidene form.

If hydrogen halide is not to be recovered, the dihalide can be simply heated with a quantity of base equivalent to that required to neutralize the hydrogen halide to be produced from the tertiary grouping. The primary bromide is not affected and a mixture of α- and β-citronellyl bromide results. The identity of the base is not critical, soda ash or lime are satisfactory and cheap. Having produced the mixed α- and β-forms of the citronellyl bromide, it can be converted to the corresponding alcohol mixture by alkaline hydrolysis or it can be first treated with boiling 10% hydrobromic or other mineral acid to convert it largely to the β-form and then this can be hydrolyzed to β-citronellol.

The pyrolysis temperature is not critical. There exists an equilibrium between hydrogen halide (substantially dry) plus citronellyl (α and/or β-form) bromide on the one hand and the 2-halo-8-bromo-2,6-dimethyl octane on the other. At say, ambient temperatures, the equilibrium is very much in favor of the dihalide as evidenced by its good stability on prolonged storage. Also, temperatures employed in preparing the dihalide can range up to say 90° C. or higher. As shown in Example 2, the 2-chloro-8-bromo-2,6-dimethyl octane can even be distilled at very low pressures without pronounced decomposition. Even the 2,8-dibromo-2,6-dimethyl octane could be continuously flash distilled at very low pressures without a great deal of decomposition though the dibromide is a little less stable than is the chlorobromide. It is shown in Example 11, however, that the complete dehydrohalogenation of the tertiary bromide takes place readily at 120 to 130° C. if the hydrogen bromide is removed at 100 mm. pressure. It is evident to those skilled in the art that the pyrolysis could be conducted at a somewhat lower temperature, say 100° C., if a lower pressure were applied to the system, say 10 mm., so that the absolute pressure of the system is below the partial pressure of hydrogen bromide corresponding to the equilibrium at the temperature involved. Very low pyrolysis temperatures can be used if there is present a material capable of reacting readily and irreversibly with the hydrogen halide in equilibrium with the citronellyl bromide. Such a material is alpha pinene which would be converted to bornyl halide or a base such as soda ash, lime, or the like which would fix the hydrogen halide as a salt. Pyrolysis temperatures can therefore be quite low—say 80 to 90° C.— or lower as there is hydrogen halide present in the equilibrium in traces at quite low temperatures and to shift the equilibrium in favor of citronellyl bromide, it is necessary only to remove the hydrohalide as formed and even though the temperature may be quite low. At ambient temperatures it is necessary to use soluble bases in order to obtain economically satisfactory reaction rates. Thus, as shown in Example 22, citronellyl bromide is formed at room temperature when treated with KOH in isopropanol but some heating is required to obtain an appreciable yield at a fair rate. Sodium t-butylate in t-butanol or in general any soluble alkali will produce citronellyl bromide in like manner.

If the halide removed from the 2-position is to be directly recovered, pyrolysis in absence of a base is accomplished simply by heating the dihalide and separating the resulting hydrogen halide from the citronellyl bromide. Though pyrolysis temperatures used here can be quite low, I prefer to employ temperatures above about 110° C., that is, up to 600° C. or higher, to obtain economically useful rates of reaction. Also, it is helpful to employ vacuum at lower pyrolysis temperatures to assist in removal of the hydrogen chloride or hydrogen bromide and prevent its recombination with the citronellyl bromide to regenerate the dihalide.

Citronellyl esters are readily produced by heating the bromide with the salt of a carboxylic acid. The acetate is usually most desired and therefore, the bromide is heated with sodium acetate. Other salts can be employed satisfactorily as shown in the examples.

It is not necessary to remove the elements of hydrogen halide from the dihalide, to first produce citronellyl bromide as a separate operation, however, if the citronellyl ester is desired, the dehydrohalogenation and the displacement of the primary bromide by the acyloxy group can take place in the same reaction. Thus, one mole of dihalide is treated with two or more moles of sodium acetate whereby one mole of sodium acetate is consumed in neutralizing the mole of hydrogen halide split out from the tertiary halide and the second mole of sodium acetate reacts with the primary bromide to yield ester. Temperatures of from 75 to 230° C. can be adequately employed for these reactions. A mixture of α- and β-citronellyl acetate results. The α-citronellyl acetate can be isomerized to the β-form by hot dilute strong organic or mineral acids just as the free alcohol and the bromide is and one may therefore produce the β-form or common form of the acetate by acid treatment. The strength of the isomerizing acid is not critical. Acids as weak as acetic acid cause the conversion slowly and the stronger mineral acids cause faster reactions. Saponification of either form of citronellyl acetate yields the corresponding form of the alcohol.

It will be understood that in the above example, one mole of sodium acetate was consumed simply in neutralizing the hydrogen halide split out and in generating the double bond involving the number two carbon atom. One mole of acetic acid is, of course, produced. Any suitable base can be used for the purpose of neutralizing the hydrogen halide such as lime or soda ash and the like. Thus, one mole of the dihalide can be treated with one equivalent of soda ash and one mole or more of the salt of the carboxylic acid and the mixed α- and β-citronellyl ester results and, in the absence of production of any appreciable amount of carboxylic acid. Since bases such as soda ash are cheaper than sodium acetate, I prefer them for the neutralization of the dehydrohalogenation mixture.

It is an important feature of this invention that no racemization occurs during the steps of the process so that by starting with optically active pinenes, optically active citronellols, hydroxycitronellol and derivatives are obtained. Thus, both dextro and laevo citronellols have special uses in perfumery and in syntheses. Oil of citronella of commerce contains only the partly optically active dextro form of citronellol and the laevo form occurs only in rare and much more expensive oils. The alpha form of citronellol has not been a commercial form, but possesses a unique odor similar to but not identical with the β-form and it therefore has a special value in perfumery. Dextro citronellol is readily dehydrogenated to d-citronellol using copper chromite catalyst and the latter is converted to l-menthol by known methods. I have found that by starting with l-pinane, I produce by my process, d-citronellol and that by starting with d-pinane, I produce l-citronellol.

The following reactions, illustrated by simplified structural formulas, represent generally those encompassed by the process of this invention.

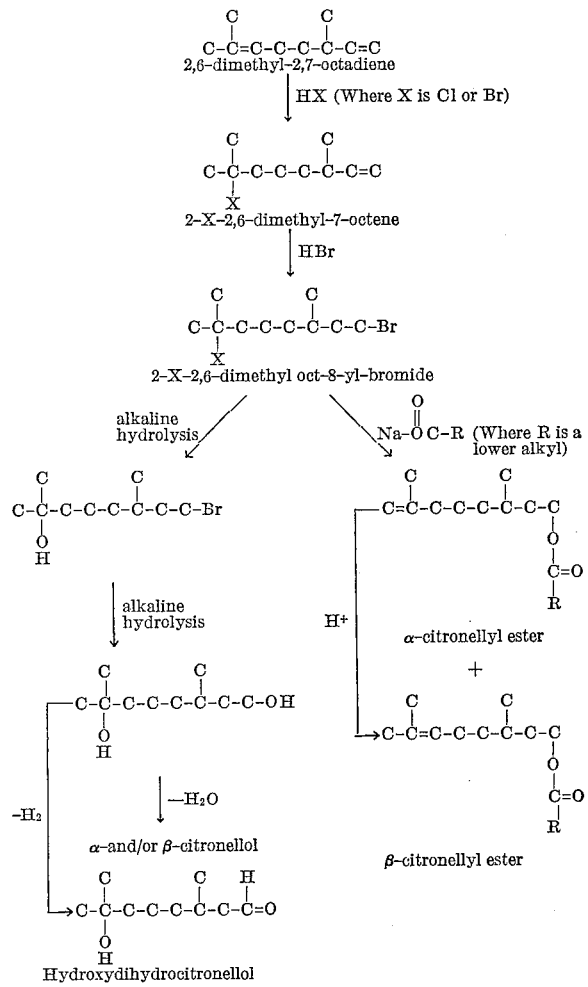

The general reactions presented above, are illustrated by specific examples below or explained elsewhere in this specification.

*Example 1*

One thousand (1000) grams of 2,6-dimethyl-2,7-octadiene (90 to 92% purity), prepared by fractionation of the pyrolysis product of 1-pinane, was hydrochlorinated at 20 to 25° C. by bubbling anhydrous HCl into the 2,6-dimethyl-2,7-octadiene until 263 grams of HCl was absorbed. Fractionation of the hydrochlorination mixture through an efficient column at 10 mm. of mercury gave 1200 grams of 2-chloro-2,6-dimethyl-7-octene, B.P. 71° C. at 10 mm., $D_4^{25}$ 0.8747, $N_D^{25}$ 1.4410, $\alpha_D^{25}$ (10 cm.) −9.38°.

Under the hydrochlorination process indicated above, it is shown that substantially all of the HCl adds to the tertiary carbon group.

*Example 2*

Hydrogen bromide, generated by dropping bromine into tetralin at 50° C. was bubbled into a mixture of 173 grams of 2-chloro-2,6-dimethyl-7-octene (prepared from 1-pinane as shown in Example 1) and 2 grams of benzoyl peroxide at 25 to 30° C. The reaction was exothermic and cooling was required to maintain the temperature at 25–30° C. After one and a half hours, the reaction ceased to be exothermic. The reaction mixture was then washed with water to yield 245 grams of crude 2-chloro-8-bromo-2,6-dimethyl-octane. Fractionation of the crude hydrobromination product followed by infrared spectroanalysis of the fractions showed that it was 6 to 8% unchanged 2-chloro-2,6-dimethyl-7-octene, 90 to 92% 2-chloro-8-bromo-2,6-dimethyl-octane (B.P. at 0.8 mm. 91° C., $N_D^{25}$ 1.4733, $D_4^{25}$ 1.1612, $\alpha_D^{25}$ (10 cm.) −5.53°) and 1 to 2% higher boiling materials.

This example demonstrates the activation of the double bond involving the number 7 and 8 carbon atoms and the abnormal addition of HBr to said double bond.

One hundred grams (100 gr.) of 2-chloro-8-bromo-2,6-dimethyl-octane, 200 ml. of water and 45 grams of calcium hydroxide were stirred at 90 to 95° C. for 32 hours. The reaction mixture was then filtered to remove unreacted lime and the oil was separated and fractionated through an efficient column. Infrared spectroanalysis of the fractions showed that the hydrolystate was 25% 2,6-dimethyl-octane-2,8-diol (hydroxy - dihydro - citronellol), B.P. 10 mm. 148° C., $D_4^{25}$ 0.9278, $\alpha_D^{25}$ (10 cm. tube) +2.2°, $N_D^{25}$ 1.4578, and about 75% of the lower boiling 8-bromo-2,6-dimethyl-octane-2-ol, B.P. 115 to 118° at 1.5 mm.

*Example 3*

One hundred (100) grams of 2-chloro-2,6-dimethyl-7-octene and 2 grams of benzoyl peroxide were agitated under a ten pound hydrogen bromide pressure. The temperature rose rapidly to 50 to 60° C. and the reaction was complete in 10 to 15 minutes. Infrared spectroanalysis of crude hydro-bromination product showed that it was 3 to 5% 2-chloro-2,6-dimethyl-7-octene and 95 to 97% 2-chloro-8-bromo-2,6-dimethyl-octane.

*Example 4*

One hundred and seventy-four (174) grams of 2-chloro-2,6-dimethyl-7-octene containing 4 grams of benzoyl peroxide and anhydrous HBr were passed countercurrently through a vertical ½″ x 24″ glass tube surrounded with a cooling jacket. The reaction was exothermic and ice water was passed through the cooling jacket to maintain the temperature at 45 to 50° C. The feed rate of chloride and hydrogen bromide to the reaction tube was such that all the chloride was passed through the tube in 30 minutes. Infrared spectroanalysis of the hydrobromination product showed that it was essentially pure 2-chloro-8-bromo-2,6-dimethyl-octane.

*Example 5*

Six hundred and seven (607) grams of 2-chloro-2,6-dimethyl-7-octene was added over a period of one hour to the ½″ x 24″ jacketed column, used in Example 4, while 100 liters per hour of anhydrous HBr and 20 liters per hour of air was bubbled into the bottom of the column which was maintained partly flooded by controlling the rate of withdrawal of product from the bottom. The reaction was exothermic and ice water was passed through the cooling jacket to maintain the temperature at 55 to 60° C. Eight hundred and eighty-five (885) grams of hydrobromination product showed that it was 2 to 4% unchanged 2-chloro-2,6-dimethyl-octene, and 96 to 98% 2-chloro-8-bromo-2,6-dimethyl-octane. When the above reaction was repeated using oxygen instead of air, the hydrobromination product was 98 to 99% 2-chloro-8-bromo-2,6-dimethyl-octane.

*Example 6*

Two hundred and seventy-six (276) grams of 2,6-dimethyl-2,7-octadiene was hydrobrominated continuously using the apparatus and HBr-air ratio shown in Example 5. The reaction was exothermic and cooling with ice water was required to maintain the temperature at 50 to 60° C. Five hundred and twenty (520) grams of hydrobromination product was recovered. Infrared spectroanalysis showed that the hydrobromination product was 3 to 5% 2-bromo-2,6-dimethyl-7-octene and 95 to 97% 2,8-dibromo-2,6-dimethyl-octane.

This example illustrates one of the unique features of the invention. Thus, even in the presence of peroxides, one mole of HBr adds normally, while the other mole adds abnormally to the terminal olefin group which has been activated by the peroxide catalyst.

*Example 7*

One hundred and ten (110) grams of 2-bromo-2,6-dimethyl-7-octene prepared by hydrobrominating 2,6-dimethyl-2,7-octadiene produced from 1-pinane and fractionating the hydrobromination product, (B.P. 10 mm. 85° C., $N_D^{25}$ 1.4605, $D_4^{25}$ 1.0616, $\alpha_D^{25}$ 10 cm. tube −9.17°), and containing 2 grams of benzoyl peroxide was hydrobrominated by bubbling anhydrous HBr into the mixture at 25 to 30° C. The reaction was exothermic and cooling was required to maintain the temperature. Infrared spectroanalysis of the reaction product (152 grams) showed that less than 2% of 2-bromo-2,6-dimethyl-7-octene remained. Fractionation of the dibromide at 0.5 mm. of mercury yielded only the dehydrobromination product, citronellyl bromide (75 to 80% alpha isomer and 20 to 25% beta isomer), (B.P. 1.5 mm. 74° C., $N_D^{25}$ 1.4721, $D_4^{25}$ 1.0955, $[\alpha_D^{25}]$ −5.37).

Fifty (50) grams of the above citronellyl bromide, 50 grams of acetic acid and 25 grams of anhydrous sodium acetate were stirred at reflux temperature for 16 hours. The reaction mixture was washer with water, followed by a sodium bicarbonate wash to yield 46 grams of crude ester. Infrared spectroanalysis of the crude ester indicated that it contained 90 to 95% citronallyl acetate (Mixture of alpha and beta forms) and 5 to 8% unchanged citronellyl bromide.

Saponification of crude citronellyl acetate followed by fractionation of the crude citronellol produced gives the pure product, B.P. 106 to 108° C. at 10 mm., $N_D^{25}$ 1.4545, $D_4^{25}$ 0.872, $[\alpha_D^{25}]$ +4.42° (when produced from 1-pinane.

*Example 8*

One hundred (100) gram portions of 2-chloro-2,6-dimethyl-7-octene and 2 grams of various peroxides were continuously hydrobrominated using the apparatus and procedure shown in Example 4. The peroxides used and the analysis of the hydrobromination product are listed in the following table.

| Peroxide | Analysis of Hydrobromination Product | |
|---|---|---|
| | Percent Unchanged 2-Chloro-2,6-dimethyl-7-octene | Percent 2-Chloro-8-bromo-2,6-dimethyl-octane |
| 2,5-dimethyl-hexane-2,5-dihydroperoxide | 17 | 73 |
| Methyl-ethyl-ketone-peroxide (60%) | 32 | 68 |
| T-butyl-perbenzoate | 10 | 90 |
| Hydrogen peroxide (90%) | 4 | 96 |
| Peracetic Acid (14% in acetic) | 23 | 77 |
| 2-Chloro-2,6-dimethyl-7-octene, air blown until it contained 1.2% hydroperoxides | 53 | 47 |

*Example 9*

Anhydrous HBr was bubbled into 200 grams of 2-chloro-2,6-dimethyl-7-octene which was being stirred in a sealed flask having a quartz window. The reaction mixture was irradiated with a General Electric sunlamp type RS throughout the reaction. The reaction was exothermic and cooling was required to maintain the temperature at 40 to 50° C. When the reaction ceased to be exothermic, the hydrobromination product was recovered and analyzed by infrared spectroanalysis. The analysis showed that the hydrobromination product was 76% unchanged 2-chloro-2,6-dimethyl-7-octene and 24% 2-chloro-8-bromo-2,6-dimethyl octane.

Unconverted 2-chloro-2,6-dimethyl-7-octene is readily stripped away from the chlorobromide at low pressures by distillation and may be recycled for further hydrobromination.

*Example 10*

Two hundred and fifty-five (255) grams of 2-chloro-8-bromo-2,6-dimethyl-8-octane, 200 grams of glacial acetic acid and 102 grams of anhydrous sodium acetate were stirred at 115 to 118° C. for 18 hours. The reaction mixture was washed with water, followed by a sodium bicarbonate wash to yield 194 grams of crude ester. The crude ester was fractionated through an efficient column at reduced pressure and the fractions were analyzed by infrared spectroanalysis and vapor phase chromatography. The analysis showed that the crude ester contained 1 to 2% hydrocarbons, 2 to 3% citronellyl bromide, 92 to 94% citronellyl acetate (60 to 65% alpha isomer, 35 to 40% beta isomer) and 2 to 3% higher boiling esters (probably 2,6 - dimethyl - octane - 2,8 - diacetate).

Other experiments using the same conditions except that no acetic acid was used initially as solvent gave approximately the same yields of citronellyl ester. Still further experiments showed that by employing reaction temperatures of about 140 to 150° C., the time of reaction could be shortened to about six hours or less.

*Example 11*

Three hundred (300) grams of the dibromo-2,6-dimethyloctane (prepared as shown in Example 6) was stirred at 120 to 130° C. at 100 mm. pressure. After HBr had been evolved for 35 hours, the pyrolyzed material was then fractionated through an efficient column at 10 mm. pressure and the fractions were analyzed by infrared spectroanalysis. The analysis showed that the dehydrobromination product was 3 to 5% hydrocarbons (primarily 2,6-dimethyl-1,7-octadiene and 2,6-dimethyl-2,7-octadiene), 83 to 85% citronellyl bromide (70 to 75% alpha isomer and 25 to 30% beta isomer), 10 to 12% polymeric materials and 2 to 3% of an unsaturated bromide whose infrared spectrum showed that it was a primary bromide having a symmetrically disubstituted ethylenic bond. This unsaturated bromide was probably 8-bromo-2,6-dimethyl-3-octene. This compound probably resulted from the dehydrobromination of a small amount of 3,8-dibromo-2,6-dimethyl-octane formed by the "abnormal" addition of HBr to both olefinic bonds of the starting 2,6-dimethyl-2,7-octadiene. When boiled with 10% hydrobromic acid, the 8-bromo-2,6-dimethyl-3-octene isomerized within a few hours to β-citronellyl bromide.

*Example 12*

One hundred and fifty (150) grams of 2,8-dibromo-2,6-dimethyl-octane (prepared as shown in Example 6) and 100 grams of sodium acetate were stirred at 110 to 120° C. for 16 hours. Analysis of the reaction mixture indicated that it contained 32 grams of acetic acid. The reaction mixture was then washed with water followed by a sodium bicarbonate wash to yield 102 grams of crude ester. Fractionation of the crude ester through an efficient column at 10 mm. pressure followed by infrared spectroanalysis of the fractions showed that the crude ester contained 2 to 4% citronellyl bromide (a mixture of alpha and beta forms), 85 to 90% citronellyl acetate (65 to 70% alpha isomer and 30 to 35% beta isomer) and 8 to 10% higher boiling compounds (halo esters and diesters).

*Example 13*

One hundred and fifty (150) grams (0.5 mole) of 2,8-dibromo-2,6-dimethyl octane (prepared as shown in Example 6) was stirred with 50 grams (0.61 mole) of anhydrous sodium acetate and 35 grams (0.33 mole) of anhydrous sodium carbonate at 110 to 120° C. for 16 hours. Carbon dioxide was evolved during the reaction. The reaction mixture was then washed with water followed by a sodium bicarbonate wash to yield 100 grams of crude ester. Fractionation of the crude ester followed by infrared spectroanalysis of the fractions showed that the crude ester contained 3 to 5% citronellyl bromide (a mixture of alpha and beta forms), 85 to 90% citronellyl acetate (70 to 75% alpha isomer and 25 to 30% beta isomer) and 8 to 10% higher boiling compounds.

Example 14

Three hundred (300) grams of 2,8-dibromo-2,6-dimethyl-octane (prepared as shown in Example 6) and 300 grams of water were stirred at reflux temperature and samples were taken periodically. Infrared spectroanalysis of the samples indicated the following.

The infrared spectrum of a sample of the oil layer taken after two hours reflux showed that it contained 25 to 30% tertiary alcohol as shown by the intensity of the characteristic tertiary alcohol absorption at 8.8 $\mu$. The infrared spectrum of the sample taken after 10 hours stirring at reflux indicated that the oil layer was 75 to 80% citronellyl bromide (60 to 65% alpha isomer and 35 to 40% beta isomer) and 15 to 20% 2,8-dibromo-2,6-dimethyl-octane. After 20 hours stirring at reflux, fractionation of the product coupled with the infrared spectrum of the oil layer and spectra of the fractions showed that it was 90 to 95% citronellyl bromide (85 to 90% beta isomer and 10 to 15% alpha isomer), 2 to 4% citronellol (mixture of $\alpha$- and $\beta$-forms) and 5 to 10% 2,8-dibromo-2,6-dimethyl-octane. Titration of a sample of the aqueous layer after stirring 20 hours at reflux showed that it contained 19% hydrogen bromide.

This example shows that the tertiary bromine atom at the 2-position is hydrolyzed by water to produce the corresponding tertiary alcohol, but as hydrolysis proceeds the acidity of the water increases to the point that dehydration occurs and no alcohol remains. Finally, the long, hot acid treatment causes isomerization of the alpha to the beta citronellyl form of the bromide. Some, but not much of the primary bromide hydrolyzes here.

Example 15

One hundred and fifty (150) grams of 2,8-dibromo-2,6-dimethyl-octane (prepared as shown in Example 6), 300 ml. of water and 50 grams of calcium hydroxide were stirred at 85 to 90° C. for 15 hours. The reaction mixture was filtered to remove unreacted calcium hydroxide and the oil layer was separated to give 110 grams of hydrolysate. The hydrolysate was 90 to 95% 8-bromo-2-hydroxy-2,6-dimethyl-octane as shown by the intensities of the characteristic tertiary hydroxyl absorption at 8.8 $\mu$ and the characteristic primary bromide absorptions at 8.1 and 8.2 $\mu$. There was also present a small amount of 2,6-dimethyl-octane-2,8-diol and unchanged 2,8-dibromo-2,6-dimethyl-octane.

The 8-bromo-2-hydroxy-2,6-dimethyl octane is a new compound and is readily dehydrated by boiling with 25% phosphoric acid for an hour to produce a mixture of $\alpha$- and $\beta$-citronellyl bromides.

The properties of the 8-bromo-2-hydroxy-2,6-dimethyl octane when purified by distillation are: B.P. 98 to 99° C. (at 0.7 mm.), $\alpha_D^{25}$ —2.77° (10 cm. tube), $D_4^{25}$ 1.0082, $N_D^{25}$ 1.4165. The hydroxy bromide is so readily dehydrated that it is difficult to obtain completely pure. The above properties refer to a fraction of about 95% purity, remainder citronellyl bromide produced during the fractionation.

Higher yields of 2,6-dimethyl-octane-2,8-diol are obtained by longer hydrolysis and/or higher hydrolysis temperatures. Hydrolysis of the primary bromide group is also facilitated through addition of emulsifiers such as soaps. Such techniques are well known in the art and are applied commercially as described, say by Groggins, Unit Processes in Chemical Engineering, with reference to hydrolysis of the amyl chlorides.

Example 16

One hundred and fifty (150) gram portions of 2,8-dibromo-2,6-dimethyl-octane were stirred at 110 to 120° C. for 16 hours with 0.31 mole of sodium carbonate and 0.62 mole of either sodium formate, sodium propionate or sodium butyrate. The reaction mixtures were washed with water followed by a sodium bicarbonate wash and the products were analyzed by infrared spectroanalysis. The analyses of the crude esters obtained are shown below:

| Organic Salt | Percent Citronellyl Bromide [1] | Percent Citronellyl Ester [1] | Percent Di-Ester |
| --- | --- | --- | --- |
| Sodium Formate | 15–20 | 75–80 | 3–5 |
| Sodium Propionate | 5–8 | 85–90 | 3–5 |
| Sodium Butyrate | 5–8 | 85–90 | 3–5 |

[1] Mixture of $\alpha$- and $\beta$-isomers.

Other salts of other carboxylic acids will be found to yield the corresponding esters when treated according to the above procedure. Thus triethylammonium valerate yields citronellyl valerate, lead stearate yields citronellyl stearate and diethyl-cyclohexyl amine sebacate yields citronellyl sebacate.

Example 17

Two hundred and fifty-five (255) grams of 2-chloro-8-bromo-2,6-dimethyl-octane, 168 grams of potassium hydroxide and 700 cc. of isopropanol were refluxed for 1.5 hours. The reaction mixture was then washed with water to yield 202 grams of oil. Fractionation of the oil followed by infrared spectroanalysis of the fractions showed that it was 3 to 5% hydrocarbons (a mixture of 2,6-dimethyl-1,7-octadiene and 2,6-dimethyl-2,7-octadiene), 2 to 4% citronellyl bromide (a mixture of alpha and beta isomers) and 90 to 95% citronellyl isopropyl ether (75 to 80% alpha isomer and 20 to 25% beta isomer), B.P. at 10 mm. 99 to 101° C., $N_D^{25}$ 1.4490, $D_4^{25}$ 0.9057, $\alpha_D^{25}$ (10 cm. tube) +0.73° (when prepared from 1-pinane).

The methyl, ethyl and isobutyl ethers are all believed to be new compositions of matter and are prepared in like manner from the corresponding alcohols. All possess pleasant characteristic citronellol-like odors.

Because of their stability to alkali, these lower alkyl ethers are useful perfumes in soap and the like.

Example 18

A 1″ x 18″ fused quartz tube set at about 20° angle to the horizontal and equipped with a dropping funnel at the higher end, a condenser at the lower end, was heated at 400° C. at a pressure of 300 mm. Hg. One hundred (100) grams of 2-chloro-8-bromo-2,6-dimethyl octane was dropped into the upper end of the hot tube at a rate of approximatley 5 ml. per minute. The hot cracked vapors passed to the condenser where liquid condensed but hydrogen chloride did not and was removed as gas by the vacuum source attached to the cold end of the condensing system. From 100 grams of 2-chloro-8-bromo-2,6-dimethyl octane, 88 grams of pyrolysate was recovered. Infrared spectroanalysis of the pyrolysate showed that it was 1 to 2% hydrocarbons (a mixture of 2,6-dimethyl-1,7-octadiene and 2,6-dimethyl-2,7-octadiene), 90 to 92% citronellyl bromide (65 to 70% alpha isomer and 30 to 35% beta isomer), and 6 to 8% unchanged 2-chloro-8-bromo-2,6-dimethyl octane.

If the pyrolysis is carried out at 400° C. at atmospheric pressure, the product recovered is 10 to 15% citronellyl bromide (a mixture of alpha and beta forms) and 85 to 90% unchanged 2-chloro-8-bromo-2,6-dimethyl-octane. When the pyrolysis is conducted at 350° C. at the same feed rate, at atmospheric pressure, only about 5% yield of citronellyl bromide is produced. When the pressure is reduced to about 30 mm. at this temperature, the conversion increases to about 40 to 50%.

At 450° C. at atmospheric pressure, about 15 to 20% citronellyl bromide was produced while at 30 mm. pressure conversion to citronellyl bromide was about complete. At 550 to 600° C. at atmospheric pressure, using the same apparatus but increasing the feed to 10 ml./minute, the conversion of the dibromide is about 40 to 50%. At 100 to 150 mm. pressure, the conversion is complete to citronellyl bromide. Only a few percent cracking products and polymer are formed.

An inert gas can be used instead of vacuum to suppress recombination of hydrogen halide and unsaturated bromide. Thus at 450° C. at atmospheric pressure, feed rate 5 ml. per minute, inert gas can be mixed with the entering dihalide as it vaporizes in the tube. At a flow rate of 0.2 cubic feet per minute, the conversion will be about 60 to 75%.

Dehydrohalogenation catalysts are well known, but I have not found them to be necessary.

Example 19

One hundred (100) grams of 2,8-dibromo-2,6-dimethyl-octane was passed through the fused quartz tube used in Example 18 at 400° C. at a pressure of 32 mm. to give 75 grams of pyrolysate. Infrared spectroanalysis of the pyrolysate indicated that it had the following composition: 1 to 2% hydrocarbons (a mixture of 2,6-dimethyl-1,7-octadiene and 2,6-dimethyl-2,7-octadiene), 80 to 85% citronellyl bromide (65 to 70% alpha isomer and 30 to 35% beta isomer), 2 to 3% unchanged 2,8-dibromo-2,6-dimethyl-octane, 8 to 10% polymeric materials and 2 to 3% of an unsaturated bromide whose infrared spectrum showed that it was a primary bromide having a symmetrically disubstituted ethylenic bond. This unsaturated bromide is probably 8-bromo-2,6-dimethyl-3-octene.

If the above pyrolysis is carried out at 400° C., at atmospheric pressure, the pyrolysate contains 15 to 20% citronellyl bromide (a mixture of alpha and beta isomers), 65 to 70% unchanged 2,8-dibromo-2,6-dimethyl-octane, 1 to 2% of the unsaturated bromide which is believed to be 8-bromo-2,6-dimethyl-3-octene and a small amount of polymeric materials.

Example 20

Two hundred and fifty-five (255) grams of 2-chloro-8-bromo-2,6-dimethyl octane and 100 grams of calcium hydroxide were stirred at 120 to 130° C. and samples were taken periodically. The samples were filtered to remove inorganic compounds and the resulting oil was analyzed by infrared spectroanalysis. This analysis showed that the sample taken after 8 hours had the following composition: 1 to 2% hydrocarbons (a mixture of 2,6-dimethyl-1,7-octadiene and 2,6-dimethyl-2,7-octadiene), 75 to 80% citronellyl bromide (70 to 75% alpha isomer and 25 to 30% beta isomer), and 20 to 22% unchanged 2-chloro-8-bromo-2,6-dimethyl octane. The product recovered after 18 hours stirring at temperature was 2 to 3% hydrocarbons (a mixture of 2,6-dimethyl-2,7-octadiene and 2,6-dimethyl-1,7-octadiene), 90 to 95% citronellyl bromide (65 to 70% alpha isomer and 30 to 35% beta isomer), and 5 to 8% unchanged 2-chloro-8-bromo-2,6-dimethyl-octane.

The rate of conversion can be increased by use of higher temperatures and, if desired, the operation can be made semi-continuous. Thus, the reaction vessel (suitably agitated) is heated to about 150 to 160° C. and this temperature is maintained as a slurry of dihalide and sodium carbonate is fed. A vacuum of say 100 to 150 mm. is applied to the vessel through a short fractionating column and citronellyl bromide and water of reaction are removed as formed leaving sodium halide in the reaction vessel. It will be understood that the temperature and operating pressure are not critical but that each may be adjusted with respect to the other so that unchanged dihalide remains in the vessel with the base and the volatile reaction products are removed substantially free of the higher boiling dihalide.

Example 21

Two hundred and fifty-five (255) grams of 2-chloro-8-bromo-2,6-dimethyl-octane and 90 grams of sodium acetate were heated at 110 to 120° C. with stirring. After 10 hours the reaction mixture was washed with water followed by a sodium bicarbonate wash to yield 224 grams of oil. The oil was fractionated through an efficient column at 1 to 2 mm. and the fractions were analyzed by infrared spectroanalysis. The analysis showed that the reaction product was 1 to 2% hydrocarbons, 90 to 95% citronellyl bromide (50 to 60% alpha isomer and 40 to 45% beta isomer), a trace of unchanged 2-chloro-8-bromo-2,6-dimethyl octane, and a trace of esters (probably a mixture of citronellyl acetate and 2,6-dimethyl-octane-2,8-diacetate).

Example 22

One hundred grams (100) of 2-chloro-8-bromo-2,6-dimethyloctane, one hundred (100) cc. of isopropanol containing 22 grams of KOH were mixed and allowed to stand for 18 hours at 25 to 30° C. A small sample was then washed with water to remove the isopropanol and inorganic compounds and the resulting oil was analyzed by infrared spectroanalysis. The analysis showed that the product was 3 to 5% citronellyl bromide, 1 to 2% citronellyl isopropyl ether and the remainder unchanged 2-chloro-8-bromo-2,6-dimethyl octane. The remaining reaction mixture was then heated at 50° C. for 6 hours. The reaction mixture was then washed with water to remove isopropanol and inorganic compounds and the resulting oil analyzed by infrared spectroanalysis. This analysis showed that the reaction product was 1 to 2% hydrocarbons (a mixture of 2,6-dimethyl-1,7-octadiene and 2,6-dimethyl-2,7-octadiene), 50 to 55% cironellyl bromide (65 to 60% alpha isomer and 30 to 35% beta isomer), 15 to 20% citronellyl isopropyl ether (60 to 65% alpha isomer and 35 to 40% beta isomer) and 15 to 20% unchanged 2-chloro-8-bromo-2,6-dimethyl octane.

Less ether formation occurs when the solvent, if an alcohol, is more sertically hindered. Thus tertiary alcohols such as terpineol or t-butanol may be employed as solvent for the alkali which may be added as the metal, i.e., sodium, to produce the alkoxide prior to introduction of dihalide. Better yields of citronellyl bromide result since there is less ether formation in such systems.

Also, sodium or potassium hydroxides or carbonates can be used. Here it is preferable to use about one equivalent of base in relatively concentrated solution, say 20 to 50% base in water with one mole of dihalide. Heating the dihalide with such basic solutions with good agitation results in good yield of citronellyl bromide with little formation of citronellol. Temperatures as low as 50° C. can be used but 75 to 100° C. gives good results in much shorter time.

If the hydrolysis of the primary bromide group is also desired, then I employ enough base to neutralize the acid produced on hydrolysis, and I find it preferable to use more dilute alkali, if a soluble alkali is used, say 5 to 10% by weight in water. Use of emulsifiers and good agitation is very desirable for the hydrolysis. As shown in Example 2, lime is a very suitable base for hydrolysis as the solution is not too strongly alkaline due to limited solubility of the lime and also the lime particles act as an emulsifier.

Example 23

One mole of 8-bromo-2,6-dimethyl-octane-2-ol is heated with two moles sodium acetate with agitation at 115 to 125° C. for twenty-four hours. After cooling and washing with water, the crude 2-hydroxy-2,6-dimethyl-oct-8-yl acetate is saponified with alcoholic alkali, again cooled, washed and then fractionated to obtain a product consisting almost entirely of 2,6-dimethyl-octane-2,8-diol.

Example 24

One mole 2-chloro-8-bromo-2,6-dimethyl octane was heated with two and a half moles sodium acetate and with agitation to 230° C. in an autoclave. At the end of ten (10) hours the autoclave was cooled and the content was removed and washed with water to remove water soluble materials, chiefly acetic acid and inorganic salts. The washed organic layer was analyzed by fractionation and vapor phase chromatography methods to show that it consisted of approximately 50% citronellyl acetate and 50% hydrocarbons including 2,6-dimethyl-2,7-octadiene. It was evident that the time of reaction at this temperature should be shortened to improve the yield, or, alternatively, a lower temperature, say 200° C., could be used for the same length of time.

The same experiment was repeated at 75° C. except that it was run in glass equipment at atmospheric pressure. The yield of citronellyl acetate was only about 5 to 10%. The remainder of the product was largely citronellyl bromide. Evidently much longer than ten (10) hours would be required to give satisfactory conversions at this temperature but since citronellyl bromide can be recycled to sodium acetate treatment, no loss of valuable product occurs at low temperature as does occur at 230° C. when hydrocarbons are produced.

The above two experiments were repeated using one mole citronellyl bromide instead of the 2-chloro compound and using only one and a quarter moles of sodium acetate. Again the yield of citronellyl acetate was about 50% at 230° C. and about 5 to 10% at 75° C.

It will be appreciated that I have provided a process for preparing a variety of useful and novel products by the addition of hydrogen bromide to 2-chloro- (or 2-bromo-) 2,6-dimethyl-7-octene and 2,6 - dimethyl - 2,7-octadiene in the presence of a peroxide catalyst and the subsequent treatment of the di-halo compounds in accordance with my process described and exemplified above. Thus, under the conditions described above, that is, those conditions conducive to the anti-Markownikow addition of hydrogen bromide to the 7 and 8 double bond of the 2,6-dimethyl octane derivative(s) described, I can cause hydrogen bromide to add to the 7 and 8 double bond of a 2-halo-2,6-dimethyl-7-octene compound, by treating the compound in the presence of air, oxygen or free radicals to thereby activate the double bond and cause the hydrogen bromide to add in anti-Markownikow fashion, or in the case of the 2,6-dimethyl-2,7-octadiene, to cause the hydrogen bromide (or chloride) to add normally to the 2 and 3 double bond while causing the hydrogen bromide to add abnormally to the 7 and 8 double bond.

In the claims, whenever I employ the term peroxide(s), I intend to include free radicals generally whether added to the compound being treated or produced in situ by irradiation or air blowing.

Having thus described my invention, I hereby claim:

1. A process for preparing a compound of the formula (a) 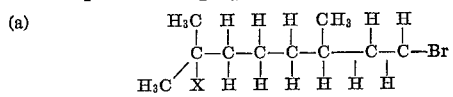

which essentially comprises treating a compound of the formula selected from the group consisting of (b) 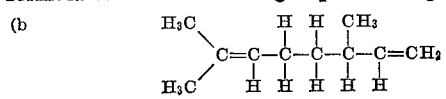

(c) 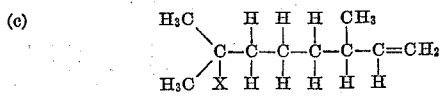

Where X in the Formula a and c is selected from the group consisting of bromine and chlorine, with substantially anhydrous hydrogen bromide, said treatment consisting of adding about two moles of hydrogen bromide to one mole of the compound of Formula b and about one mole of hydrogen bromide per mole of the compound of Formula c, said addition being conducted in the presence of a peroxide catalyst.

2. The process of claim 1 wherein the addition of hydrogen bromide to compound (b) is carried out at a temperature of from about 0° to about 90° C. in the presence of from about ½ to about 2 percent of a peroxide catalyst.

3. The process of claim 2 wherein the peroxide catalyst is formed by treating compound (b) with oxygen.

4. The process of claim 3 wherein the compound treated is 2-chloro-2,6-dimethyl-7-octene.

5. The process of claim 3 wherein the compound treated is 2-bromo-2,6-dimethyl-7-octene.

6. The process of claim 3 wherein the compound treated is 2,6-dimethyl-2,7-octadiene.

7. The process which comprises essentially in adding hydrogen bromide to 2-chloro-2,6-dimethyl-7-octene in the presence of a peroxide catalyst, the addition being conducted at a temperature of from about 0° to 90° C. and recovering from said addition 2-chloro-8-bromo-2,6-dimethyl octane.

8. The process of claim 7 wherein the peroxide catalyst is formed by adding to the octene a gas comprising essentially oxygen.

9. A process for preparing a mixture of alpha and beta citronellyl bromides which comprises treating an unsaturated compound selected from the group consisting of 2-chloro-2,6-dimethyl-7-octene, 2-bromo-2,6 - dimethyl-7-octene and 2,6-dimethyl-2,7-octadiene by adding thereto hydrogen bromide, the amount of hydrogen bromide added being sufficient to saturate said unsaturated compound, the addition of hydrogen bromide being carried out in the presence of from about ½ to 2 percent of a peroxide and at a temperature of from about 0° C. to 90° C., recovering from said treatment a saturated compound containing an HX group on the number 2 carbon atom and a carbon atom adjacent thereto, the X in said HX group being selected from the group consisting of chlorine and bromine, and removing said HX from said number 2 carbon atom and another carbon atom adjacent thereto by heating said compound at a temperature of from about 80° C. to 600° C.

10. The process of claim 9 wherein the HX group is removed from said saturated compound by heating said compound at a temperature of from about 80 to 130° C. in the presence of a base, the amount of said base being sufficient to neutralize the HX removed from said saturated compound.

11. A method for producing a mixture of alpha and beta citronellyl bromides which comprises essentially in (a) treating 2,6-dimethyl-2,7-octadiene by adding thereto about two moles of hydrogen bromide, said treatment being carried out in the presence of a catalytic amount of a peroxide and obtaining from said treatment 2,8-dibromo-2,6-dimethyl octane, removing one mole of HBr from the number 2 carbon atom containing the bromine and hydrogen from the carbon atom adjacent to said number 2 carbon atom by heating at a temperature of from 80° to 600° C. and recovering therefrom said citronellyl bromide.

12. A process for producing a mixture of citronellyl bromides rich in the alpha form which comprises heating a compound selected from the group consisting of 2-chloro-8-bromo-2,6-dimethyl octane and 2,8-dibromo-2,6- dimethyl octane at a temperature of from about 80 to 600° C.

13. A process for preparing a citronellyl ester rich in the alpha form which comprises essentially in heating at a temperature of from 75 to 230° C., a compound selected from the group consisting of 2-chloro-8-bromo-2,6-dimethyl octane and 2,8-dibromo-2,6-dimethyl octane with a carboxylic acid salt and a basic substance, the amount of said carboxylic acid salt and basic substance being sufficient to neutralize liberated hydrogen chloride or bromide and to produce said ester.

14. The process of claim 13 wherein the citronellyl ester product is heated further in an acid medium to isomerize the alpha citronellyl ester to beta citronellyl ester.

15. A process for preparing a mixture of alpha and beta citronellyl esters which comprises essentially in treating an unsaturated compound selected from the group consisting of 2-chloro-2,6-dimethyl-7-octene, 2-bromo-2,6-dimethyl-7-octene and 2,6-dimethyl-2,7-octadiene by adding thereto hydrogen bromide, the amount of hydrogen bromide added being sufficient to saturate said unsaturated compound, said addition being carried out in the presence of from about ½ to 2 percent of a peroxide formed by the addition of oxygen and said addition of hydrogen bromide being conducted at a temperature of from about 0° C. to 90° C., recovering from said treatment a saturated compound containing an HX group on the number 2 carbon atom and a carbon atom adjacent thereto, the X in said HX group being selected from the group consisting of chlorine and bromine, removing said HX group from said number 2 carbon atom and a carbon atom adjacent thereto by heating said compound at a temperature of from about 80° C. to 600° C., recovering a mixture of alpha and beta citronellyl bromides therefrom, heating said bromides with a carboxylic acid salt at a temperature of from 75 to 230° C., the amount of said carboxylic acid salt being sufficient to form said citronellyl esters, and recovering from said treatment said citronellyl esters.

16. The process of claim 15, wherein the citronellyl esters rich in the alpha form are further heated in a dilute acidic medium to isomerize the alpha product to beta citronellyl ester.

17. A process for preparing a mixture of alpha and beta citronellyl esters which comprises essentially in treating an unsaturated compound selected from the group consisting of 2-chloro-2,6-dimethyl-7-octene, 2-bromo-2,6-dimethyl-7-octene and 2,6 - dimethyl-2,7-octadiene by adding thereto hydrogen bromide, the amount of hydrogen bromide added being sufficient to saturate said unsaturated compound, said addition being carried out in the presence of from about ½ to 2 percent of a peroxide formed by the addition of oxygen and said addition of hydrogen bromide being conducted at a temperature of from about 0° C. to 90° C., recovering from said treatment a saturated compound containing an HX group on the number 2 carbon atom and a carbon atom adjacent thereto, the X in said HX group being selected from the group consisting of chlorine and bromine, and refluxing said saturated compound with an amount of a base sufficient to neutralize liberated HX and a salt of a carboxylic acid sufficient to form said esters.

18. 2-chloro-8-bromo-2,6-dimethyl octane.
19. 2,8-dibromo-2,6-dimethyl octane.
20. 8-bromo-2-hydroxy-2,6-dimethyl octane.
21. The process for producing compounds of the general formula (a) 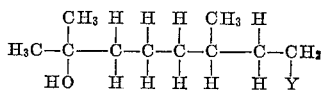

in which Y is a monovalent radical selected from the class consisting of bromine and hydroxy radicals which essentially comprises treating a compound selected from the class consisting of those of the formulae (b) 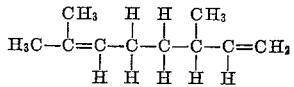

and (c) 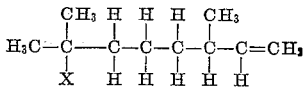

wherein X is a radical selected from the class consisting of chlorine and bromine, with substantially anhydrous hydrogen bromide, said treatment consisting of adding about two moles of hydrogen bromide to one mole of the compound of Formula b and about one mole of hydrogen bromide per mole of compound of Formula c, said addition being conducted in the presence of a peroxide catalyst, whereby there is produced a dihalide of Formula d;

(d) 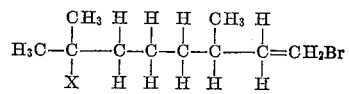

in which X is selected from the class consisting of chlorine and bromine, and subjecting said dihalide to an aqueous alkaline hydrolysis.

References Cited in the file of this patent

Abelmann: Ber. Deut. Chem. 43, 1588 (1910).
Mannich et al.: Ber. Deut. Chem. 69B, 2121–2122 (1936).
Beilstein: "Handbuch der Organischen Chemie," vol. I, Second Supplement, 1941, pp. 125, 131 and 459.
Palomaa: Ber. Deut. Chem. 77B, 66 (1944).
Morel, Chemical Abstracts 47, 10179 (1953).
Buchta et al.: Ann. Chem. Justus Liebigs 598, 3, 4, 16 (1956).

UNITED STATES PATENT OFFICE
CERTIFICATION OF CORRECTION

Patent No. 3,005,845

October 24, 1961

Joseph P. Bain

It is hereby certified that error appears in the above numbered patent requiring correction and that the said Letters Patent should read as corrected below.

Column 1, line 23, for "methanol" read -- menthol --; line 31, for "pipane" read -- pinane --; column 2, lines 55 to 59, the formula should appear as shown below instead of as in the patent:

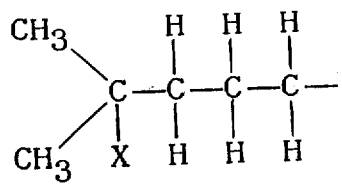

column 9, line 6, for "d-citronellol" read -- d-citronellal --; column 16, line 51, for "sertically" read -- sterically --; column 20, lines 39 to 43, the formula should appear as shown below instead of as in the patent:

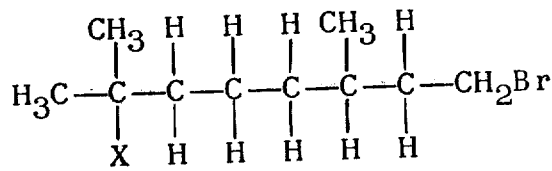

Signed and sealed this 10th day of April 1962.

Attest:

ERNEST W. SWIDER
Attesting Officer

DAVID L. LADD
Commissioner of Patents